July 6, 1943.  F. WAGNER  2,323,739
PHOTOGRAPHIC CAMERA
Filed March 17, 1941
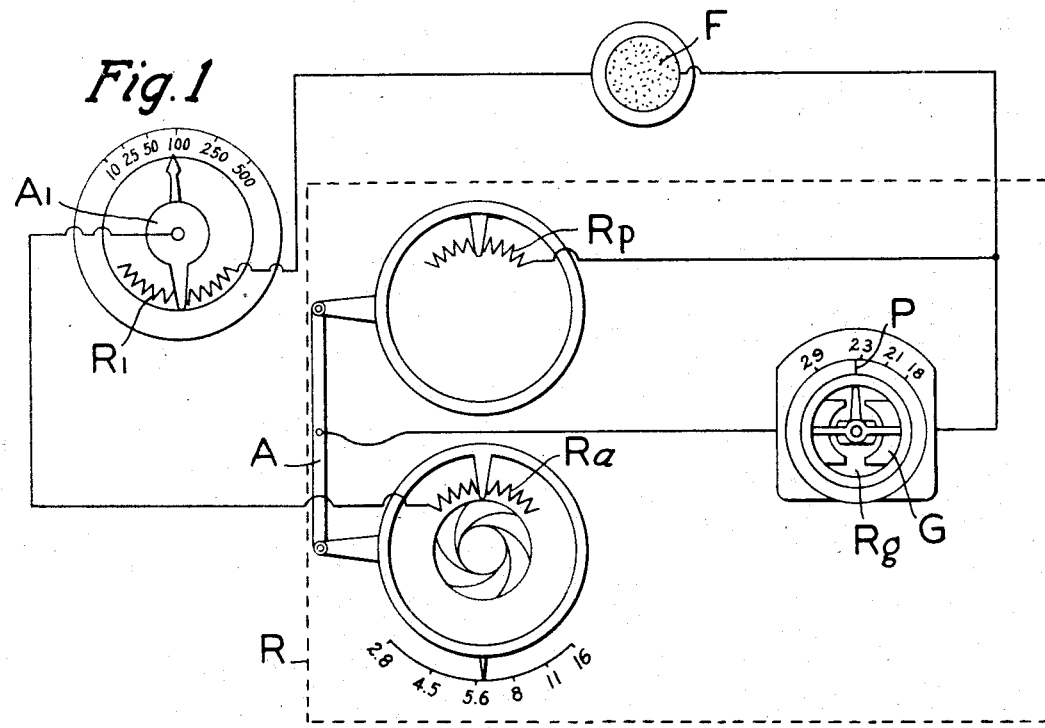
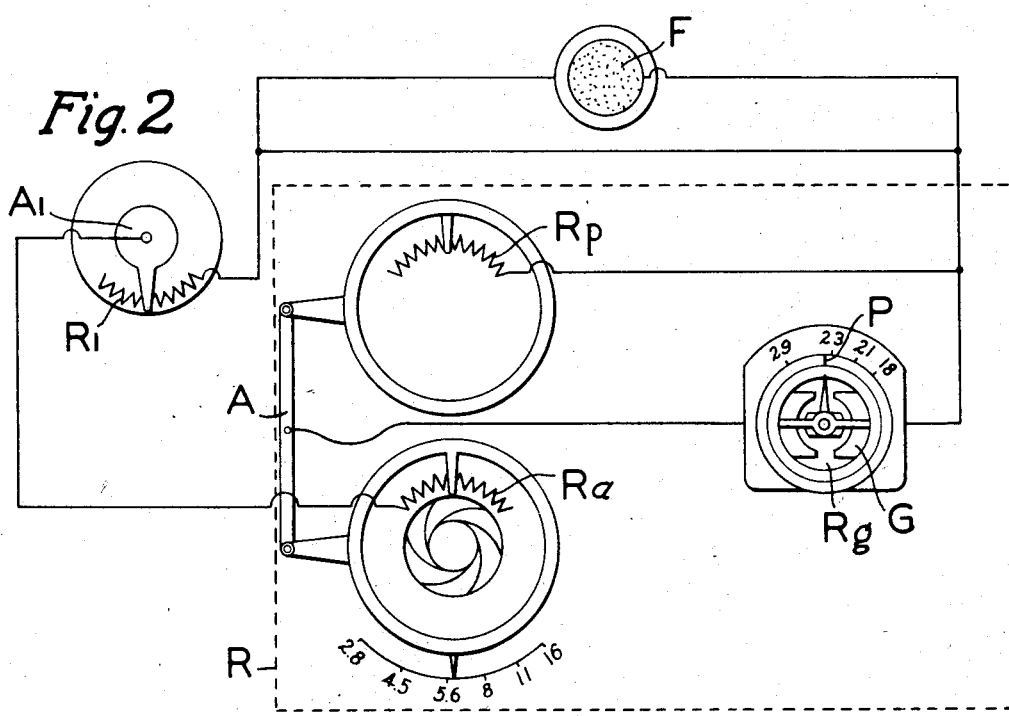
INVENTOR
Ferdinand Wagner
BY
ATTORNEY Patented July 6, 1943

2,323,739

UNITED STATES PATENT OFFICE 2,323,739

PHOTOGRAPHIC CAMERA

Ferdinand Wagner, Munich, Germany, assignor to General Aniline & Film Corporation, New York, N. Y., a corporation of Delaware Application March 17, 1941, Serial No. 383,760
In Germany March 6, 1940

4 Claims. (Cl. 95—10)

My present invention relates to improvements in photographic cameras provided with a photoelectric exposure meter.

There are already photographic cameras fitted with a photoelectric exposure meter in which electrical resistances are operatively connected to the various adjustable members of the camera as, for instance, the diaphragm means and the shutter speed adjustment means and are also adapted to be adjusted to various film speeds. These known resistances were connected to the galvanometer either in series or in parallel. It has also been proposed to arrange one resistance in series and another resistance in parallel to the photoelectric element. All these arrangements, however, are of disadvantage inasmuch as upon changing one of the resistances the current which flows through the measuring instrument does not alter proportionally to this change because it is also dependent on the other resistance. This disadvantage cannot be overcome by connecting one of the resistances in parallel to the measuring instrument since the values of this resistance do not correspond with those of the other resistance connected either in parallel or in series thereto.

It is an object of my invention to remove this difficulty by providing an improvement in the connection of the resistances.

Further objects of the invention will be pointed out more specifically in the following description with reference to the accompanying drawing disclosing by way of example two modifications of the invention.

Referring to the drawing:

Figure 1 diagrammatically shows the arrangement of two resistances connected in series to the photoelectric element and of one resistance connected in parallel to the galvanometer and Figure 2 shows the arrangement of one resistance connected in series and one resistance connected in parallel to the photoelectric element and of one resistance connected in parallel to the galvanometer.

The objects of the invention are accomplished by coupling a resistance connected in parallel to a galvanometer with a resistance connected in series to the galvanometer in such a manner that the total resistance of the system consisting of the said resistances and the internal resistance of the galvanometer remains constant regardless of the adjustment of the means for regulating the exposure coupled therewith, i. e., for adjusting the shutter speed or size of the diaphragm aperture.

In Figure 1 F designates the photoelectric element and G the galvanometer. The mark P is brought in coincidence with the number corresponding to the speed, i. e., sensitiveness of the film used. Parallel to the galvanometer there is then arranged a resistance $Rp$ which is coupled with another resistance $Ra$ by a common adjusting member A. The resistance $Ra$ is positioned in series to the resistance $R_1$ and the galvanometer G. The resistances $Rp$ and $Ra$ are connected with one another in such a manner that the resistance $Ra$ is raised with decreasing resistance $Rp$ and vice versa. The total system consisting of resistance $Rg$ of galvanometer G, resistance $Rp$, and resistance $Ra$ has a constant resistance R regardless of the adjustment of the resistances $Rp$ and $Ra$. If the resistance $R_1$, for instance, serves to regulate the shutter speed, the adjusting member $A_1$ is coupled with the shutter adjusting lever of the photographic camera, whereas the adjusting member A is rigidly connected with the diaphragm adjusting lever of the camera.

If the resistance $Rp$ being parallel to the galvanometer G is zero, the resistance $Ra$ must increase to a value which corresponds to the internal resistance $Rg$ of the galvanometer. If the resistance $Rp$, however, is adjusted for maximum value, the resistance $Ra$ must vanish in order that the total resistance R is again equal to the internal resistance $Rg$ of the galvanometer G. If the resistance $Rp$ is equal to the value $Rg$, the resistance $Ra$ will be $Rg/2$. If the resistance $Rp$ is equal to $Rg/3$, $Ra$ will amount to $\frac{3}{4} Rg$, etc., in order to ensure that the total resistance R remains constant.

As this example shows there is a certain regularity in the rising and falling of the two resistances $Rp$ and $Ra$ and it is, therefore, possible to couple these resistances by means of a common bridge contact without altering the total resistance R of the system By the connection according to the invention the resistance $Ra$ can be adjusted regardless of the adjustment of the resistance $R_1$ and one always obtains the same deflection of the galvanometer with equivalent light values in contrast with the connections hitherto known.

Figure 2 shows another modification of the connection according to the invention, the resistance $R_1$ being positioned parallel to the photoelectric element F. It is dependent on the kind of the photoelectric element employed whether the connection scheme shown in Figure 1 or that of Figure 2 is to be used. If the element supplies a current having a very low intensity and a relatively high voltage, the connection in series is to be preferred whereas the connection in parallel according to Figure 2 is employed if the photoelectric element supplies a current having a low voltage and a relatively high intensity.

I claim:

1. In a photographic camera having a shutter and diaphragm and means for adjusting the action of the same, a photoelectric exposure meter comprising an electric circuit including a galvanometer, a photoelectric element for actuating said galvanometer, a first variable resistance mechanically coupled with said means for adjusting the shutter action, a second variable resistance mechanically coupled with said means for adjusting the diaphragm action and connected in series with the galvanometer and photoelectric element, a third variable resistance connected in parallel with said galvanometer and means for electrically coupling said second and third resistances in such a manner that the electrical resistance of one of said second and third resistances increases as that of the other decreases and vice versa, to thereby insure that the total electrical resistance of said second and third resistances and the internal resistance of said galvanometer remains constant regardless of the adjustment of said second resistance.

2. In a device as defined in claim 1, wherein said first resistance is connected in parallel with said photoelectric element and galvanometer.

3. In a photographic camera having a shutter and diaphragm and means for adjusting the action of the same, a photoelectric exposure meter comprising an electric circuit including a galvanometer, a photoelectric element for actuating said galvanometer, a first variable resistance mechanically coupled with said means for adjusting the shutter action and connected in series with the photoelectric element and galvanometer, a second variable resistance mechanically coupled with said means for adjusting the diaphragm action and connected in parallel with the galvanometer, a third variable resistance connected in parallel with said galvanometer and means for electrically coupling said second and third resistances in such a manner that the electrical resistance of one of said second and third resistances increases as that of the other decreases and vice versa, to thereby insure that the total electrical resistance of said second and third resistances and the internal resistance of said galvanometer remains constant regardless of the adjustment of said second resistance.

4. In a photographic camera having a shutter and diaphragm and means for adjusting the action of the same, a photoelectric exposure meter comprising an electric circuit including a galvanometer, a photoelectric element for actuating said galvanometer, a first variable resistance connected in series with said galvanometer and photoelectric element, a second variable resistance connected in parallel with said galvanometer, one of said resistances being mechanically coupled with said adjusting means, and means for electrically and mechanically coupling said two variable resistances with each other in such a manner that the electrical resistance of one of them increases as the other decreases and vice versa, thereby maintaining the total electrical resistance of said two variable resistances and the internal resistance of the galvanometer at a constant value regardless of the adjustment of the variable resistance coupled with said adjusting means.

FERDINAND WAGNER.